(12) United States Patent
Van Hook et al.

(10) Patent No.: US 6,564,304 B1
(45) Date of Patent: May 13, 2003

(54) MEMORY PROCESSING SYSTEM AND METHOD FOR ACCESSING MEMORY INCLUDING REORDERING MEMORY REQUESTS TO REDUCE MODE SWITCHING

(75) Inventors: Timothy J. Van Hook, Atherton, CA (US); Man Kit Tang, Saratoga, CA (US)

(73) Assignee: ATI Technologies Inc., Ontario (CA)

( * ) Notice: Subject to any disclaimer, the term of this patent is extended or adjusted under 35 U.S.C. 154(b) by 18 days.

(21) Appl. No.: 09/653,763

(22) Filed: Sep. 1, 2000

(51) Int. Cl.⁷ .............................................. G06F 13/14
(52) U.S. Cl. ...................... 711/154; 711/157; 711/158; 710/39; 345/535
(58) Field of Search ............................ 711/5, 157, 169, 711/154, 209, 158; 710/39, 54; 345/535

(56) References Cited

U.S. PATENT DOCUMENTS

| | | | | |
|---|---|---|---|---|
| 5,630,096 A | * | 5/1997 | Zuravleff et al. ........... | 711/154 |
| 5,740,402 A | * | 4/1998 | Bratt et al. ................. | 711/157 |
| 5,745,913 A | * | 4/1998 | Pattin et al. ................ | 711/105 |
| 5,822,772 A | * | 10/1998 | Chan et al. ................. | 711/158 |
| 5,852,451 A | * | 12/1998 | Cox et al. ................... | 345/570 |
| 5,948,081 A | * | 9/1999 | Foster ......................... | 710/39 |
| 5,987,574 A | * | 11/1999 | Paluch ........................ | 711/158 |
| 6,170,042 B1 | * | 1/2001 | Gaertner et al. ............ | 711/158 |
| 6,173,378 B1 | * | 1/2001 | Rozario et al. ............. | 711/163 |
| 6,272,600 B1 | * | 8/2001 | Talbot et al. ............... | 711/140 |

* cited by examiner

Primary Examiner—Glenn Gossage
(74) Attorney, Agent, or Firm—J. D. Harriman, II, Esq.; Coudert Brothers LLP

(57) ABSTRACT

A memory processing system and method for accessing memory in a graphics processing system are disclosed in which memory accesses are reordered. A memory controller arbitrates memory access requests from a plurality of memory requesters (referred to as "masters"). Reads are grouped together and writes are grouped together to avoid mode switching. Instructions are reordered to minimize page switches. In one embodiment, reads are given priority and writes are deferred. The memory accesses come from different masters. Each master provides memory access requests into its own associated request queue. The master provides page break decisions and other optimization information in its own queue. The masters also notify the memory controller of their latency requirements. The memory controller uses the queue and page break decisions to reorder the requests from all queues for efficient page and bank access while considering latency requirements. A sort queue may be used to reorder the requests. The result is improved memory access performance.

13 Claims, 5 Drawing Sheets

MEMORY PROCESSING SYSTEM AND METHOD FOR ACCESSING MEMORY INCLUDING REORDERING MEMORY REQUESTS TO REDUCE MODE SWITCHING

BACKGROUND

1. Field of the Invention

This invention relates to the field of memory control.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

2. Background

Computer systems often require the storage and access of large amounts of data. One efficient solution for storing large amounts of data is to use a dynamic random access memory (DRAM) system. Some DRAM systems have multiple memory requesters seeking to access the memory, which can cause contention problems and degrade system performance. This is particularly true in graphics processing systems. The problems of such systems can be better understood by reviewing existing graphics computer and memory systems.

Computer systems are often used to generate and display graphics on a display. Display images are made up of thousands of tiny dots, where each dot is one of thousands or millions of colors. These dots are known as picture elements, or "pixels". Each pixel has a color, with the color of each pixel being represented by a number value stored in the computer system.

A three dimensional (3D) display image, although displayed using a two dimensional (2D) array of pixels, may in fact be created by rendering of a plurality of graphical objects. Examples of graphical objects include points, lines, polygons, and three dimensional solid objects. Points, lines, and polygons represent rendering "primitives" which are the basis for most rendering instructions. More complex structures, such as three dimensional objects, are formed from a combination or mesh of such primitives. To display a particular scene, the visible primitives associated with the scene are drawn individually by determining those pixels that fall within the edges of the primitive, and obtaining the attributes of the primitive that correspond to each of those pixels. The obtained attributes are used to determine the displayed color values of applicable pixels.

Sometimes, a three dimensional display image is formed from overlapping primitives or surfaces. A blending function based on an opacity value associated with each pixel of each primitive is used to blend the colors of overlapping surfaces or layers when the top surface is not completely opaque. The final displayed color of an individual pixel may thus be a blend of colors from multiple surfaces or layers.

In some cases, graphical data is rendered by executing instructions from an application that is drawing data to a display. During image rendering, three dimensional data is processed into a two dimensional image suitable for display. The three dimensional image data represents attributes such as color, opacity, texture, depth, and perspective information. The draw commands from a program drawing to the display may include, for example, X and Y coordinates for the vertices of the primitive, as well as some attribute parameters for the primitive, and a drawing command. The execution of drawing commands to generate a display image is known as graphics processing.

A graphics processing system accesses graphics data from a memory system such as a DRAM. Often a graphics processing computer system includes multiple processing units sharing one memory system. These processing units may include, for example, a central processing unit (CPU) accessing instructions and data, an input/output (I/O) system, a 2D graphics processor, a 3D graphics processor, a display processor, and others. The 3D processor itself may include multiple sub-processors such as a processor to fetch 3D graphical drawing commands, a processor to fetch texture image data, a processor to fetch and write depth (Z) data, and a processor to fetch and write color data. This means that multiple memory accesses are being sent to the memory simultaneously. This multiple access can cause contention problems.

The goal of a memory system is to get the highest memory capacity and bandwidth at the lowest cost. However, the performance of a shared DRAM system can be severely degraded by competing memory request streams for a number of factors, including page and bank switches, read and write context switches, and latency requirements, among others.

Memory Words and Pages

The data stored in DRAM is organized as one or two-dimensional tiles of image data referred to as memory "words". A memory word is a logical container of data in a memory. For example, each memory word may contain eight to sixteen pixels of data (e.g., sixteen to thirty-two bytes).

The DRAM memory words are further organized into memory "pages" containing, for example, one to two kilobytes (K byes) of data. The pages are logical groups of memory words. A DRAM therefore consists of multiple memory pages with each page consisting of multiple memory words. The memory words and pages are considered to have word and page "boundaries". To read data from one memory word and then begin reading data from another memory word is to "cross the word boundary". Similarly, reading data from one page and then reading data from another page is considered to be crossing a page boundary.

In DRAM memory, it is faster to retrieve data from a single memory word than to cross a word boundary. Similarly it is faster to retrieve data from a single page than to cross a page boundary. This is because peak efficiency is achieved when transferring multiple data values, especially data values that are in adjacent memory locations. For example, for a burst transfer of data in adjacent memory locations, a DRAM may support a transfer rate of eight bytes per clock cycle. The same DRAM device my have a transfer rate of only one byte per nine clock cycles for arbitrary single byte transfers (e.g. those that cross boundaries). Thus, separate accesses to single bytes of data are less efficient than a single access of multiple consecutive bytes of data. Therefore, data in a DRAM memory is typically accessed (written to or read from) as a complete memory word.

The performance cost to access a new memory word from DRAM is much greater than for accessing a data value within the same memory word. Similarly, the cost of accessing a data value from a new memory bank is much greater than from within the same page in the memory bank. Typically, a word in the same page of the same bank can be accessed in the next clock cycle, while accessing a new page can take around 10 extra clock cycles. Furthermore, a new page in a new bank can be accessed in parallel with an access to another bank, so that the 10 extra clock cycles to access a word in a new page in a new bank can be hidden during the access of other words in other pages in other banks.

Read/Write Switches

Access penalties also occur when switching from reads to writes. It is more efficient to do a number of reads without switching to a write operation and vice-versa. The cost in cycles to switch from a write operation to a read operation is significant. Because typically DRAM data pins are bidirectional, that is, they carry both read and write data, and DRAM access is pipelined, that is, reads occur over several clocks, then switching the DRAM from read access to write access incurs several idle clocks to switch the data pin direction and the access pipeline direction.

Latency Requirements

Certain memory requesting processors have specific bandwidth and latency requirements. For example, CPU accesses and requests have low latency requirements and must be satisfied quickly for overall system performance. This is because the CPU typically reads memory on a cache miss, and typically suspends instruction execution when the instructions or data not in the cache are not available within a few clock cycles, and can only support a small number of outstanding memory read requests. Consequently, CPU performance is latency intolerant because CPU execution stops soon after an outstanding memory request. Other memory requesters may have high bandwidth requirements but may be latency tolerant.

Another problem that arises from graphics processing systems is the tendency to have frame buffers that interleave data across DRAM pages and memory banks. This creates situations where boundary crossings are likely to be increased, decreasing memory access efficiency. This is because graphics working data set sizes are the entire graphical image, typically 1 to 8 megabytes (M bytes) in size, and consequently DRAM page locality of 1 to 2K bytes cannot be maintained, so it is better for graphics processing to efficiently access few words in many pages than many words in few pages. Interleaving graphical image memory words across DRAM pages and banks can amortize the cost of new page and bank access over many word accesses.

SUMMARY OF THE INVENTION

In accordance with the present invention, memory accesses are reordered to improve efficiency. A memory controller is used to arbitrate memory access requests from a plurality of memory requesters. Reads are grouped together and writes are grouped together to avoid mode switching. Instructions are reordered so that page switches are minimized. In one embodiment, reads are given priority and writes are deferred. In accordance with the present invention, a memory request controller is provided in a combined CPU and graphics processing architecture. The memory accesses in the invention come from different "masters". Each memory requester (referred to as a "master") provides memory access request into its own associated request queue. The master provides page break decisions and other optimization information on its own with that information being provided in the queue. The masters also notify the memory controller of latency requirements they may have. The memory controller uses the queue and page break decisions to provide appropriate reordering of the requests from all of the request queues for efficient page and bank access while considering latency requirements. The result is improved overall memory access.

DETAILED DESCRIPTION OF THE INVENTION

A method and apparatus for memory control is described. In the following description, numerous specific details are set forth in order to provide a more detailed description of the invention. It will be apparent, however, to one skilled in the art, that the present invention may be practiced without these specific details. In other instances, well known details have not been provided so as to not unnecessarily obscure the invention.

The present invention is a memory controller that permits the memory requests from different memory masters to be re-ordered to optimize memory performance. Each memory master provides its memory requests to its own associated request queue. The memory master attempts to order its own requests for optimized memory access as if it were the sole owner of the memory system. This includes grouping bank accesses and read and write operation. The memory master also provides latency requirement information about itself in the request queue.

The requests from each request queue are provided to a sort queue in an order to optimize memory access for the entire system, considering all of the memory masters. An arbitrator makes decisions about how to order the memory requests from the request queues and loads them into the sort queue for execution. A bypass path can provide high priority (low latency) requests directly to the arbitrator without going through the request queues so that those request can be satisfied immediately. The present invention supports out of order processing of memory requests.

Figure 1:
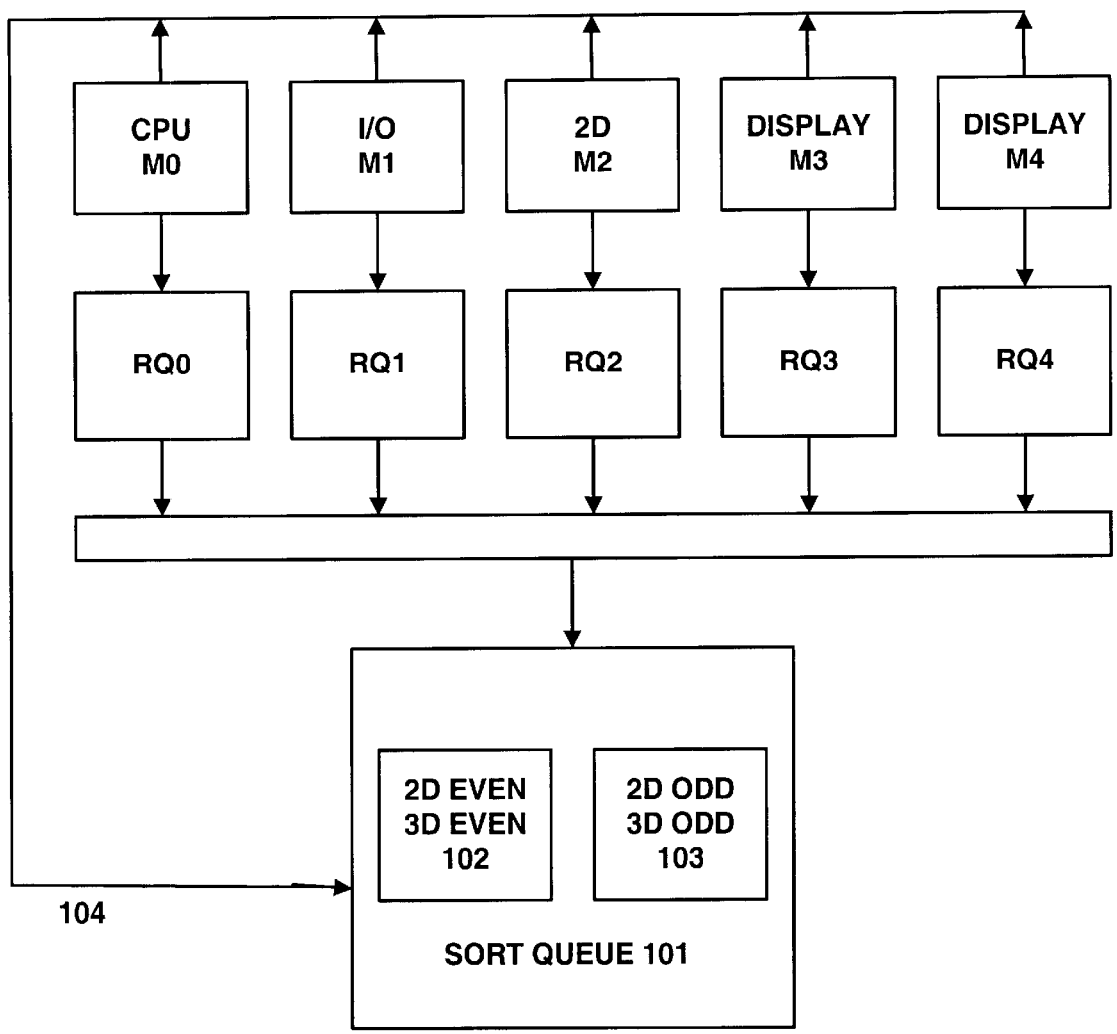
FIG. 1 is a block diagram depicting memory masters, request queues and a sort queue in accordance with one embodiment of the present invention.

FIG. 1 is a block diagram depicting memory masters, request queues and a sort queue in accordance with one embodiment of the present invention. A number of memory masters M0–M4 generate memory access requests. The memory masters may include CPU M0, I/O M1, 2D master M2 (e.g. a drawing program generating 2D display data), display processor M3, and 3D and Z master M4 (e.g. a 3D graphics processor or drawing program). Although only five masters are shown by way of example in FIG. 1, the actual number of masters may be any number.

Each memory master M0–M4 has an associated request queue RQ 0–RQ 4 respectively. The outputs of the RQs are provided to the sort queue 101 that includes banks 102 and 103. Memory controller 105 is coupled with each of the request queues RQ0–RQ4 and orders the requests in RQ 0–RQ 4.

In operation, each memory master generates memory requests to be serviced. The memory master sorts its requests in its associated request queue to optimize the memory access for that master. This master specific sorting is done independently of the other memory masters as if a master had exclusive ownership of the DRAM. The local optimization attempts to reduce bank switches while grouping together reads and writes to minimize context switching.

All of the request queue data is provided to the sort queue 101. The sort queue is used to optimize memory access and re-order the memory request while considering all of the memory masters. The sort queue 101 takes into account latency requirements of the masters as well as attempting to reduce bank switching and creating appropriately sized burst of reads and writes to reduce context switching. A bypass path 104 is provided directly to the sort queue so that high priority request can be handled out of turn and satisfied within latency requirements. Any of the memory masters that require such high priority memory access and provide request on the bypass path.

In one embodiment of the invention, two DRAM banks are used. One bank can be accessed while preparing the other bank, effectively hiding the preparation time and achieving high efficiency . This is especially true when there are a large number of masters generating request streams. The odds of more than one of the masters accessing one of the two banks at the same time is 50%, increasing the ability to sort multiple requests into one of the two banks to avoid bank switching. Note that if the number of bank partitions is increased, the odds of multiple streams accessing any one of the banks actually is less than with fewer banks. One embodiment of the invention uses two banks to achieve a well distributed locus of accesses.

The same thing applies to read/write distribution. There is a high chance of two or more masters having read requests or write requests, permitting more reads and writes to be grouped together.

A bypass path is provided for CPU read requests presuming that CPU read requests have the highest priority and are needed to maintain computational efficiency.

Sorting and Re-Ordering

The memory controller performs on the memory requests in the request queues to sort and reorder them to optimize memory access. This is possible because the system provides for out of order satisfaction of memory requests. As shown in the flow diagram of FIG. 2, reads and writes are reordered at step 201. The reordering involves grouping reads together with reads and writes together with writes as much as possible. Then page accesses within a memory bank are grouped together and sorted at step 202. At step 203, bursts are interleaved across memory banks.

The sorting and reordering also takes into account the latency requirements, i.e. the priority, of the requesting master. At step 201, urgent read requests, such as from a high priority master, will stop a write burst. So master priority has an affect on the read/write sorting process. Similarly, priority is taken into account during the page sorting step 202. If there is a read burst with a number of requests in a page. If a more urgent request occurs (e.g. a CPU read request from a different page) then the read burst is terminated to service the CPU request. The sorting and execution is dynamic. After sorting, the system performs the requests in the sorted order unless a higher priority request occurs.

At the new priority level, the sorting may be reordered after an interruption. For example, if the sort had been in write mode and an urgent read request must be serviced, the system would not automatically return to write mode (a context switch) unless that was an optimized decision at that time.

The memory controller satisfies two overall functions during its operation. One is to reorder memory access to provide the best DRAM throughput. The other function is to dispatch memory requests from a special request queue (the bypass request queue).

Figure 3:
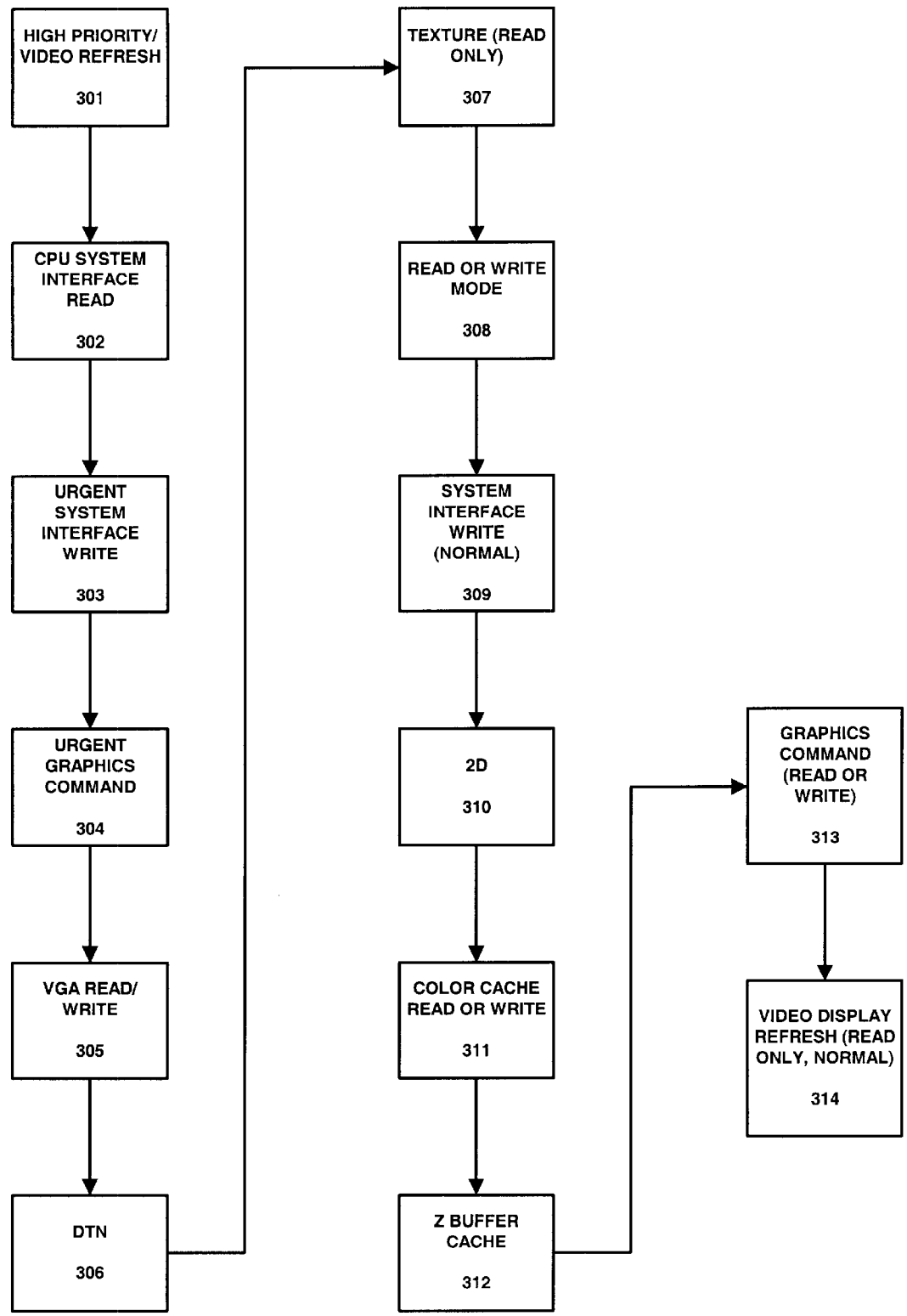
FIG. 3 is a flow diagram depicting the memory request sorting order used in accordance to an embodiment of the present invention.

FIG. 3 is a flow diagram depicting the memory request sorting order used in accordance with an embodiment of the present invention. The first requests to be ordered are high priority DRAM requests or high priority video refresh requests 301. CPU system interface read requests 302 are next and change the context to read mode. High priority system interface writes 303 are satisfied next. Urgent graphics commands 304 such as high priority command reads or high priority command writes. Next in line are video graphics array (VGA) reads or writes 305. DTN (i.e. Do This Now) requests 306 from the color and Z units are placed next, followed by texture reads 307.

Read or write mode requests 308 of all lower priorities are placed with the default being to continue in the prevailing mode. The mode is changed when a higher priority request of the other mode is encountered. A system interface write 309 of normal priority is next, followed by a 2D read or write command 310. Color cache reads and writes 311 are then placed, followed by Z buffer cache read or write requests 312, read/write graphics commands 313, and video display refreshes 314 that are read only and normal requests.

Figure 2:
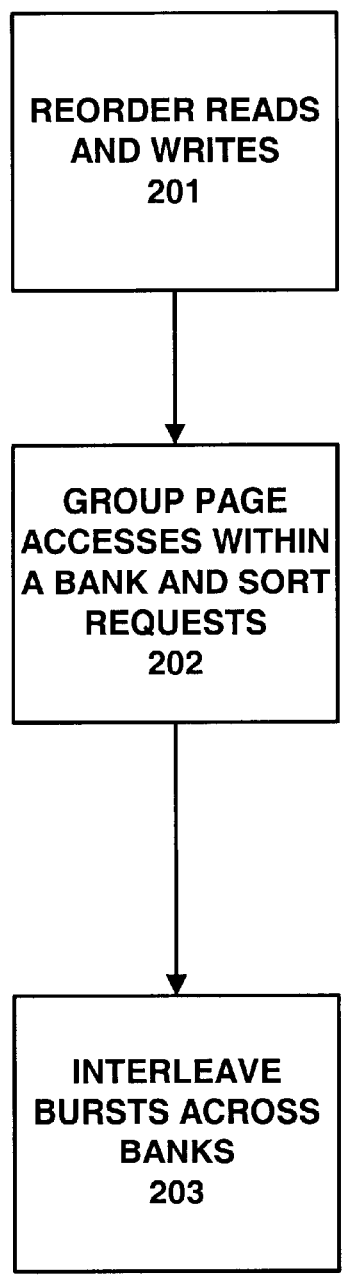
FIG. 2 is a flow diagram outlining the process of reordering write and read operations according to one embodiment of the present invention.
Figure 4:
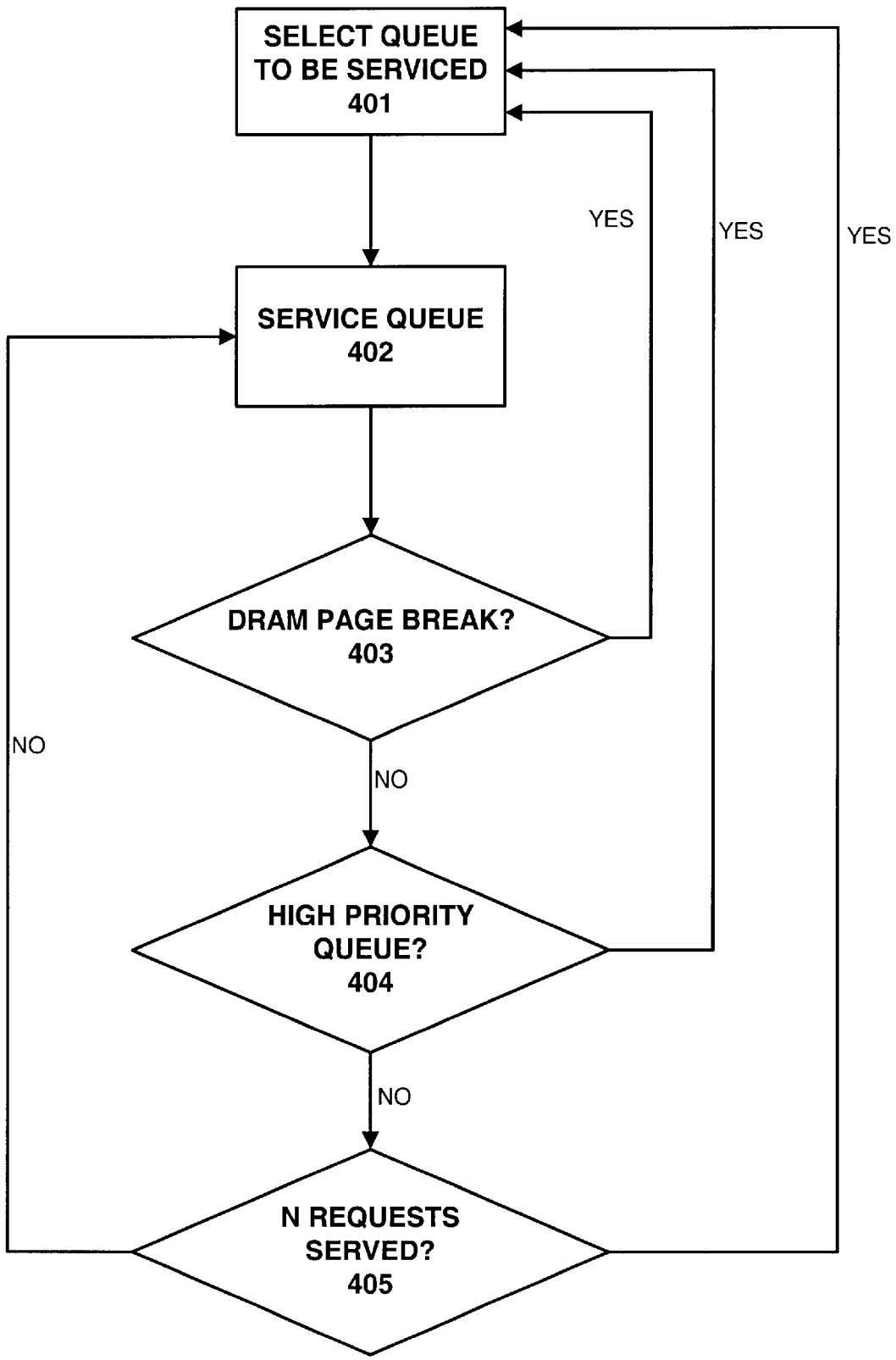
FIG. 4 is a flow diagram illustrating the operation of selecting requests from queues according to an embodiment of the present invention.

The operation of sorting is accomplished by selecting one of the request queues for servicing based on the requirements described in FIGS. 2 and 3. The servicing of a request queue continues until a higher priority queue exists or the selected queue is invalid. FIG. 4 is a flow diagram illustrating the operation of selecting requests from queues according to an embodiment of the present invention. At step 401, a queue is selected to be serviced according to the selection criteria of FIGS. 2 and 3. At step 402 the next available request in the queue is serviced. At decision block 403 it is determined if a DRAM page break is encountered. If so, the appropriate next queue to service is selected at 401. If not, a determination is made at decision block 404 as to whether a higher priority queue exists. If so, the higher priority queue is selected at step 401. If not, the system proceeds to optional decision block 405 to determine if some number "N" requests have been serviced for the queue. This is used when the number of requests to be serviced consecutively for a queue is to be limited. If yes, the next queue to be serviced is selected at step 401. If not, the next request in the presently selected queue is serviced at step 402.

Figure 5:
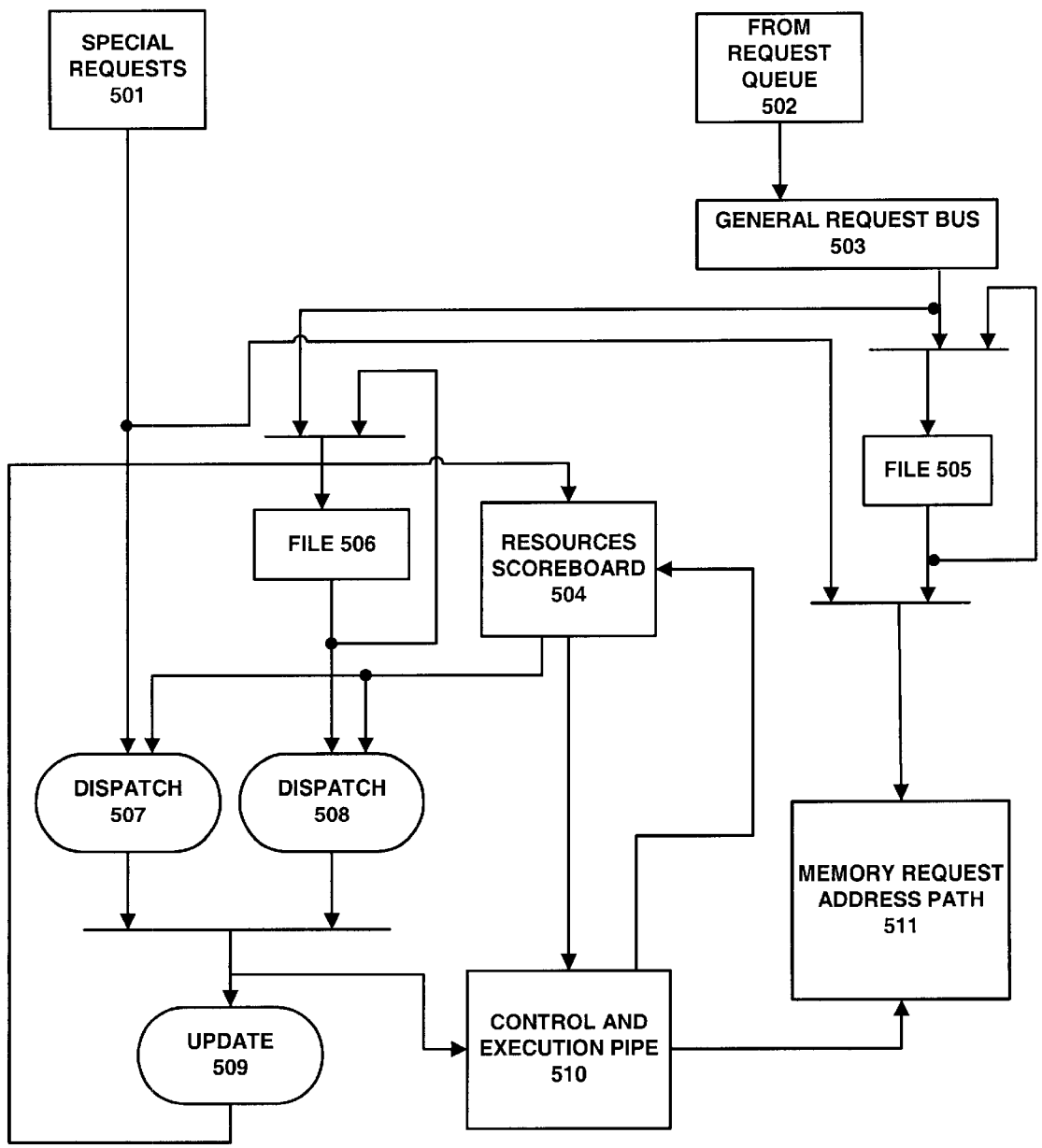
FIG. 5 is a block diagram of the port selection system according to an embodiment of the present invention.

In one embodiment of the invention, there are separate paths for general memory requests and special memory requests. FIG. 5 is a block diagram of an embodiment of the general/special port selection scheme. High priority memory requests are provided through special request port 501. General requests from the requests queues at port 502 are provided to the general request bus 503. The general request selected by the memory control arbitration unit is provided to file 506 where it may be stalled before being provided to dispatch stage 508. The special request is provided to dispatch stage 507 and to the output of file 505 where it may be mixed into the memory request address path 511.

The general request is provided to file 505 where it may be stalled with a feedback loop pending special request handling. The outputs of dispatch stages 507 and 508 are mixed into update stage 509 whose output is provided to resources scoreboard 504. The outputs of resources scoreboard 504 are provided to dispatch stages 507 and 508 and to control and execution pipe 510. Control and execution pipe 510 provides a reset signal to the resources scoreboard and an output to the memory request address path 511.

The special request path serves CPU speculative and system memory interface read requests. The memory controller has an interface for choosing between the two types of read requests. In general, memory read requests from the special request port are given priority over requests from the general request port. A request from the general request port interrupted by a special request is stalled until there is no more conflict with the special request port. Read requests from the special request port are serviced as soon as there is no pending high priority general memory request and there is no scheduled general memory request or an ongoing general memory read request is finished or a scheduled write request is aborted.

The resources scoreboard tracks various resources (e.g. double data rate (DDR) synchronous dynamic random access memory (SDRAM) resources) so that dispatch stages or logic can schedule a memory request. For example, where there are multiple dual in-line memory modules (DIMMs), the scoreboard can track which DIMM is last accessed. Status bits are included to identify whether a memory bank is ready to be activated. Row address strobe (RAS) cycle time for each DRAM bank is tracked so that pipelining of requests can be accomplished. Bank activation status and column address strobe (CAS) command status is also tracked in the scoreboard resource. DDR SDRAM data pins read busy and DDR SDRAM data pins write busy are both tracked for memory access scheduling.

The dispatch logic evaluates the resource requirement of the current memory-request and looks up the resource status from the scoreboard to determine whether to stall the request at the dispatch stage or to release it to the execution pipe. When there is a conflict, the request is stalled until the conflict is gone. At that time, the scoreboard is updated by the dispatch logic with the request's resource requirement and releases it to the execution pipe.

I claim:

1. A method of accessing memory in a graphics processing system comprising:
   generating a plurality of memory requests from a plurality of requesting masters, each of said requesting masters having an associated memory request queue, said memory requests including memory reads and memory writes;
   each of said requesting masters providing ordering information for its memory requests to its own memory request queue;
   storing said plurality of memory requests in said associated memory request queues; and
   coupling a sort queue to said plurality of request queues for receiving said plurality of memory requests and reordering said plurality of memory requests to minimize read and write mode switching, wherein said reordering comprises grouping a plurality of memory reads together in a read group and grouping a plurality of memory writes together in a write group.

2. The method of claim 1 wherein said reordering further comprises executing all requests in one of said read group and said write group before switching to the other of said read group and said write group.

3. The method of claim 1 further including each of said requesting masters providing page information with said memory requests.

4. The method of claim 3 wherein said reordering further comprises reordering said requests using said page information such that page breaks are minimized.

5. The method of claim 1 further including each of said requesting masters providing, in one of said memory request queues coupled with each of said requesting masters, latency information for said memory requests.

6. The method of claim 5, wherein said reordering further comprises reordering said plurality of memory requests to satisfy latency requirements for said requesting masters based on said latency information.

7. The method of claim 1 wherein said reordering further comprises reordering, along with said memory requests, additional memory requests that are sent by said plurality of requesting masters via a bypass path.

8. A memory processing system comprising;
   a plurality of requesting masters, each of said masters generating a plurality of memory requests including memory reads and memory writes;
   a plurality of request queues, each of said request queues coupled to a respective one of said plurality of requesting masters for receiving corresponding ones of said plurality of memory requests, said requesting masters providing ordering information for requests to its own request queue; and
   a sort queue coupled to said plurality of request queues for receiving said plurality of memory requests, said sort queue reordering said memory requests to reduce read and write mode changes by creating groups of memory reads and groups of memory writes.

9. The memory processing system of claim 8 wherein said plurality of memory requesters can provide said plurality of requests directly to said sort queue via a bypass path.

10. The memory processing system of claim 8 wherein each of said requesting masters provides page information with said memory requests.

11. The memory processing system of claim 10 wherein said sort queue reorders said requests using said page information such that page breaks are minimized.

12. The memory processing system of claim 8 wherein each of said requesting masters provides in a respective one of said request queues latency information for its memory requests.

13. The memory processing system of claim 12 wherein said sort queue reorders said plurality of memory requests to satisfy latency requirements for said requesting masters based on said latency information.

* * * * *